United States Patent
Rong et al.

(10) Patent No.: US 9,690,552 B2
(45) Date of Patent: Jun. 27, 2017

(54) TECHNOLOGIES FOR LOW-LEVEL COMPOSABLE HIGH PERFORMANCE COMPUTING LIBRARIES

(71) Applicant: Intel Corporation, Santa Clara, CA (US)

(72) Inventors: Hongbo Rong, San Jose, CA (US);
Peng Tu, San Ramon, CA (US);
Tatiana Shpeisman, Menlo Park, CA (US); Hai Liu, Hillsboro, OR (US);
Todd A. Anderson, Hillsboro, OR (US); Youfeng Wu, Santa Clara, CA (US); Paul M. Petersen, Champaign, IL (US); Victor W. Lee, Santa Clara, CA (US); P. G. Lowney, Hudson, MA (US); Arch D. Robison, Champaign, IL (US); Cheng Wang, San Ramon, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/583,657

(22) Filed: Dec. 27, 2014

(65) Prior Publication Data
US 2016/0188305 A1   Jun. 30, 2016

(51) Int. Cl.
*G06F 9/44* (2006.01)
*G06F 9/45* (2006.01)

(52) U.S. Cl.
CPC .................. *G06F 8/43* (2013.01); *G06F 8/31* (2013.01); *G06F 8/4441* (2013.01); *G06F 8/453* (2013.01); *G06F 8/49* (2013.01)

(58) Field of Classification Search
None
See application file for complete search history.

(56) References Cited

U.S. PATENT DOCUMENTS

2006/0190934 A1*  8/2006  Kielstra .............. G06F 9/45516
                                                                      717/148

OTHER PUBLICATIONS

Nathan Bell and Jared Hoberock, "Thrust: A Productivity-Oriented Library for CUDA," GPU Computing Gems: Jade Edition, Aug. 2011.

(Continued)

*Primary Examiner* — Qamrun Nahar
(74) *Attorney, Agent, or Firm* — Barnes & Thornburg LLP

(57) ABSTRACT

Technologies for generating composable library functions include a first computing device that includes a library compiler configured to compile a composable library and second computing device that includes an application compiler configured to compose library functions of the composable library based on a plurality of abstractions written at different levels of abstractions. For example, the abstractions may include an algorithm abstraction at a high level, a blocked-algorithm abstraction at medium level, and a region-based code abstraction at a low level. Other embodiments are described and claimed herein.

25 Claims, 13 Drawing Sheets

(56) References Cited

OTHER PUBLICATIONS

Todd Veldhuizen, "Bliz++ user's guide", Mar. 2006.
Todd Veldhuizen, "Techniques for scientific C++", Aug. 2000.
Jan Fousek, Jiří Filipovič, Matus Madzin, "Automatic Fusions of CUDA-GPU Kernels for Parallel Map," ACM SIGARCH Computer Architecture News. 39(4), Sep. 2011.
Brian Grant, et al., "An evaluation of staged run-time optimizations in DyC," PLDI '99 Proceedings of the ACM SIGPLAN May 1999 conference on Programming language design and implementation.
Ehsan Totoni, et al., "Easy, Fast and Energy Efficient Object Detection on Heterogeneous On-Chip Architectures," TACO, Dec. 2013.

\* cited by examiner

```
                                                                              600
602                                                                          ↙
↘
   #pragma AA in(A,B:[M,N]) out(C:[M,N], allocif(NULL)) C[I]=A[I]+B[I] ∀I∈[1:M,1:N]
604
↘
   #pragma BA in(A,B:[M,N]) out(C:[M,N, allocif(NULL)) parameters(M1:52,N1:52)
        #pragma omp parallel for collapse(2)
           for i=1 to M step M1
              for j=1 to N step N1
                 #pragma omp task depend(in:A[i: min(M1,M-(i-1)*M1), j: min(N1,N-(i-1)*N1)],
                 B[i: min(M1,M-(i-1)*M1), j: min(N1,N-(i-1)*N1)]) depend(out: C[i: min(M1,M-
                 (i-1)*M1), j: min(N1,N-(i-1)*N1)])
                    madd(&A[i,j],&B[i,j],&C[i,j],min(M1,M-(i-1)*M1),min(N1,N-(i-1)*N1))

#pragma CA in(A,B:[M,N]) out(C:[M,N])
   void madd(double* A, double *B, double* C, int M, int N)
   {
      #pragma CA alloc(C)
      if (C == NULL) C = malloc(sizeof(double)*M*N)

#pragma CA tile IV(i: 1:M:M1:52) parallel for
      for i=1 to M step M1 {
         #pragma CA tile IV(j: 1:n:N1:52) parallel for
         for j=1 to N step N1 {
            #pragma CA IV(i1: i: min(i+M1,M)) parallel for         606
            for i1=i to min(i+M1, M) {
               #pragma CA IV(j1: j: min(j+N1, N)) SIMD
               for j1=j to min(j+N1, N) {
                  C[i1,j1]=A[i1, j1] + B[i1, j1];
               }
            }
         }
      }
   }
```

// assume A, B, and C are arrays already allocated before
double *D, *E;   // output arrays of the two calls to madd() below
madd(A, B, D, M, N);
madd(C, D, E, M, N);

FIG. 12 in(A,B:[M,N]) out(D:[M,N], allocif(NULL)) D[I] = A[I] + B[I] $\forall I \in [1:M,1:N]$
in(C,D:[M,N]) out(E:[M,N], allocif(NULL)) E[I] = C[I] + D[I] $\forall I \in [1:M,1:N]$

FIG. 13 in(A,B,C:[M,N]) out(E:[M,N], allocif(NULL))
E[I]=C[I] + A[I] + B[I] $\forall I \in [1:M,1:N]$

FIG. 14 if (E == NULL) E=malloc(sizeof(double)*M*N);

FIG. 15 in(A,B,C:[M,N]) out(D,E:[M,N], allocif(NULL)) parameters(M1:52, N1:52)
pragma omp parallel for collapse(2)
for i=1 to M step M1 {
  for j=1 to N step N1 {
    #pragma omp task depend(in:A[i: min(M1,M-(i-1)*M1), j: min(N1,N-(i-1)*N1)], B[i: min(M1,M-(i-1)*M1), j: min(N1,N-(i-1)*N1)]) depend(out: D[i: min(M1,M-(i-1)*M1), j: min(N1,N-(i-1)*N1)])
    madd(&A[i,j],&B[i,j],&D[i,j],min(M1,M-(i-1)*M1),min(N1,N-(i-1)*N1))

pragma omp task depend(in:C[i: min(M1,M-(i-1)*M1), j: min(N1,N-(i-1)*N1)], D[i: min(M1,M-(i-1)*M1), j: min(N1,N-(i-1)*N1)]) depend(out: E[i: min(M1,M-(i-1)*M1), j: min(N1,N-(i-1)*N1)])
    madd(&C[i,j],&D[i,j],&E[i,j],min(M1,M-(i-1)*M1),min(N1,N-(i-1)*N1))
  }
}

FIG. 16 if (E == NULL) E=malloc(sizeof(double)*M*N); {
  for i=1 to M step M1 {
    for j=1 to N step N1 {
      for i1=i to min(i+M1, M) {
        for j1=j to min(j+N1, N) {
          double d = A[i1, j1] + B[i1, j1];
          E[i1, j1] = C[i1, j1] + d;
        }
      }
    }
  }
}

```
typedef void(*MULADD) (double a, double b, double *restrict c);
typedef double(*FINALIZE) (double c);

double* mmul(double* A, double* B, int M, int N, MULADD muladd = NULL,
        FINALIZE finalize = NULL)
{
    int i, j, k;                                    1804
    double* C = malloc(sizeof(double)*M*N);

#pragma CA parallel for
    for i=1 to M {
        for j=1 to N {           1806
            for k=1 to N {
                #pragma CA UDF(muladd in:A[i,k], B[k,j] out:C[i,j], restrict)
                if (muladd != NULL) (*muladd)(A[i,k], B[k,j], &C[i,j]);
                else C[i,j] += A[i,k] * B[k,j];
            }
            if (finalize != NULL) C[i,j] = (*finalize)(C[i,j]);
        }
    }
    return C;
}
```

```
void distance(double a, double b, double *c) {
    *c += (a – b) * (a – b);
} double* EuclideanDistance(double *A, double* B, int M, int N)
{
    return mmul(A, B, M, N, &distance, &sqrt);
}
```

FIG. 19

TECHNOLOGIES FOR LOW-LEVEL COMPOSABLE HIGH PERFORMANCE COMPUTING LIBRARIES

BACKGROUND

High-performance computing (HPC) applications typically execute calculations on computing clusters that include many individual computing nodes connected by a high-speed network fabric. Typical computing clusters may include hundreds or thousands of individual nodes. Each node may include several processors, processor cores, or other parallel computing resources. A typical computing job therefore may be executed by a large number of individual processes distributed across each computing node and across the entire computing cluster.

In HPC workloads, a sequence of library functions from one or more libraries may be called. The results of a call to a function of a library are typically consumed immediately by the next call to another library function, leaving the results as dead. Such temporary results are generally large arrays with significant space overhead. Additionally, library functions are typically constructed as stand-alone binary code, generally including a defined interface to allow the behavior of the library functions to be evoked, such as an application programming interface (API). Typically, the interface enables an application compiler to call the functions of the library individually. As such, the sequence of library function calls may not be effectively optimized across the boundaries of the individual library functions.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 6 illustrates example pseudocode of composable library abstractions disclosed herein;

FIG. 7 illustrates an example data access pattern disclosed herein;

FIG. 12 illustrates example pseudocode of two library function calls prior to composition disclosed herein;

FIG. 13 illustrates example pseudocode of algorithm abstractions of the two library function calls of FIG. 12 disclosed herein;

FIG. 14 illustrates example pseudocode of a result of a loop merge of the two library function calls of FIG. 12 using the algorithm abstractions of FIG. 13;

FIG. 15 illustrates example pseudocode of an intermediate representation after a loop merge operation on the memory allocation portion of FIG. 14 using the algorithm abstractions of FIG. 13;

FIG. 16 illustrates example pseudocode of a result of a loop merge of the two library function calls of FIG. 12 using blocked-algorithm abstractions disclosed herein;

FIG. 17 illustrates example pseudocode of a result of a loop merge of the two library function calls of FIG. 12 using region-based code abstractions disclosed herein;

FIG. 18 illustrates example pseudocode of a composition of a matrix multiply function that includes user-defined functions using region-based code abstractions disclosed herein;

FIG. 19 illustrates example pseudocode of a user application disclosed herein.

DETAILED DESCRIPTION OF THE DRAWINGS

Figure 1:
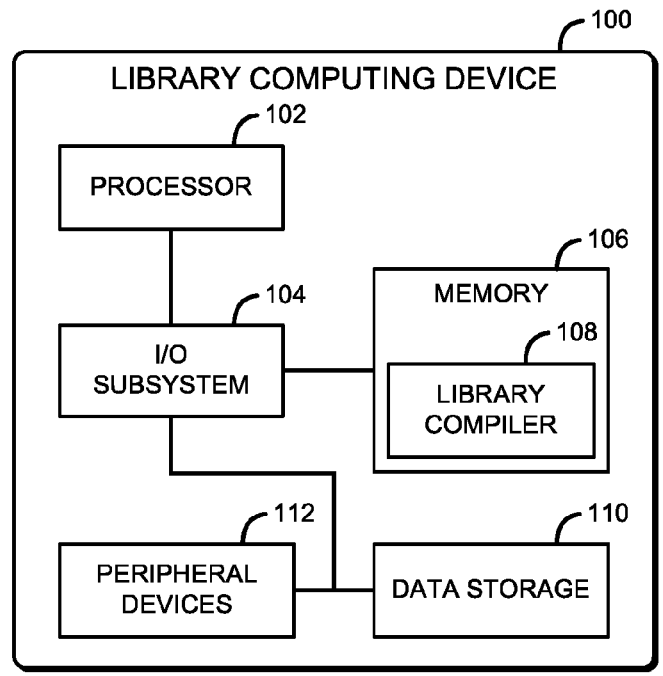
FIG. 1 is a simplified block diagram of at least one embodiment of a computing device for compiling a library with composable functions.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative library computing device 100 for compiling a composable library includes a processor 102, an input/output (I/O) subsystem 104, and a memory 106. The memory 106 includes a library compiler 108. In use, as described below, the library compiler 108 is configured to compile a composable library to generate binary code and metadata of the composable library. In some embodiments, the composable library may be a low-level high-performance computing (HPC) library. For example, a code developer may write the composable library, using domain expertise, to include library function source code and abstractions of the library functions at different granularities, which may be used to guide the library compiler 108 in compiling the composable library. The abstractions define a data space, an iteration space, and computation of the library functions. The library compiler 108 may transform the library function source code into a compiled library that includes binary code and/or an intermediate representation. Additionally, the library compiler 108 may encode the abstractions of the library functions written by the code developer into metadata of the compiled library. Additionally, aided by the abstractions, the library compiler 108 may determine data access patterns for loop operations of the compiled, composable library and store the data access patterns as part of the metadata of the compiled, composable library.

Figure 2:
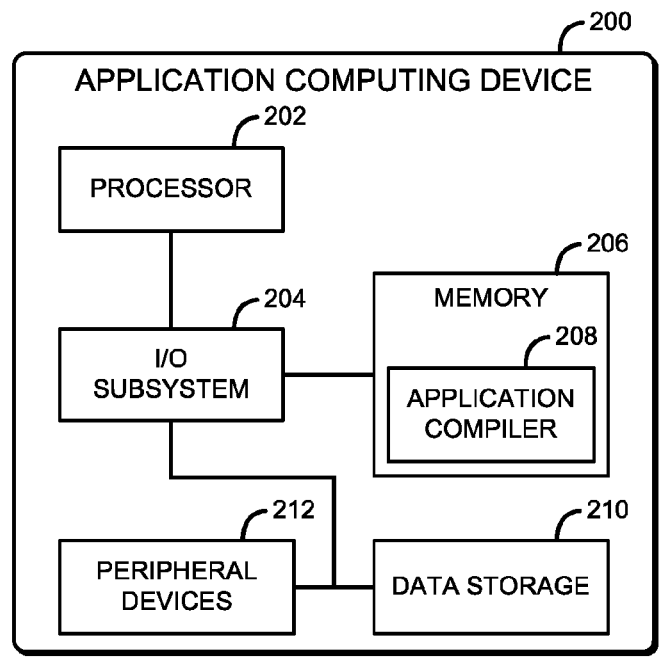
FIG. 2 is a simplified block diagram of at least one embodiment of a computing device for compiling an application that depends on the composable library compiled by the computing device of FIG. 1.

Referring now to FIG. 2, an illustrative application computing device 200 for compiling an application includes a processor 202, an input/output (I/O) subsystem 204, and a memory 206. The memory 206 includes an application compiler 208. In use, as described below, the application compiler 208 is configured to compile application source code to generate executable code of an application. To do so, the application compiler 208 calls library functions of the compiled, composable library to generate the application. The abstractions allow the application compiler 208 to compose library functions without knowing the semantics of the library functions. In other words, the application compiler 208 may use the abstractions of the compiled, composable library as instructions to be used by the application compiler 208 indicating how to compose the library functions. For example, the abstractions may indicate loops of the library functions that may be merged, whether arrays of data may be contracted into scalars, whether certain library functions may be inlined, and/or whether to perform other standard optimizations (e.g., value propagation, dead code elimination, etc.). As such, the disclosed composable library technologies allow for more efficient performance and flexibility of library function calls than traditional means to compose library calls.

Referring again to FIG. 1, the library computing device 100 may be embodied as any type of computing device capable of compiling the library function source code and performing the functions described herein. For example, the library computing device 100 may be embodied as, without limitation, a computer, a desktop computer, a workstation, a laptop computer, a notebook computer, a tablet computer, a smartphone, a distributed computing system, a multiprocessor system, a consumer electronic device, a smart appliance, and/or any other computing device capable of optimizing exponential calculations. As shown in FIG. 1, the illustrative library computing device 100 includes the processor 102, the I/O subsystem 104, the memory 106, and a data storage 110. Of course, the library computing device 100 may include other or additional components, such as those commonly found in a desktop computer (e.g., various input/output devices), in other embodiments. Additionally, in some embodiments, one or more of the illustrative components may be incorporated in, or otherwise from a portion of, another component. For example, the memory 106, or portions thereof, may be incorporated in the processor 102 in some embodiments.

The processor 102 may be embodied as any type of processor capable of performing the functions described herein. For example, the processor may be embodied as a single or multi-core processor(s), digital signal processor, microcontroller, or other processor or processing/controlling circuit. Similarly, the memory 106 may be embodied as any type of volatile or non-volatile memory or data storage capable of performing the functions described herein. In operation, the memory 106 may store various data and software used during operation of the library computing device 100 such as the library compiler 108, operating systems, applications, programs, libraries, and drivers. The memory 106 is communicatively coupled to the processor 102 via the I/O subsystem 104, which may be embodied as circuitry and/or components to facilitate input/output operations with the processor 102, the memory 106, and other components of the library computing device 100. For example, the I/O subsystem 104 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 104 may form a portion of a system-on-a-chip (SoC) and be incorporated, along with the processor 102, the memory 106, and other components of the library computing device 100, on a single integrated circuit chip.

The data storage 110 may be embodied as any type of device or devices configured for short-term or long-term storage of data such as, for example, memory devices and circuits, memory cards, hard disk drives, solid-state drives, or other data storage devices. The data storage 110 may store program files and data for the library compiler 108, as well as source code files and output object and executable files. As discussed further below, the library compiler 108 applies optimizations to exponential function calls as the library compiler 108 translates source code into object code or executable code.

In some embodiments, the library computing device 100 may also include one or more peripheral devices 112. The peripheral devices 112 may include any number of additional input/output devices, interface devices, and/or other peripheral devices. For example, in some embodiments, the peripheral devices 112 may include a display, touch screen, graphics circuitry, keyboard, mouse, speaker system, and/or other input/output devices, interface devices, and/or peripheral devices.

Referring again to FIG. 2, the application computing device 200 may be embodied as any type of device capable of compiling an application and performing the functions described herein. For example, the application computing device 200 may be embodied as, without limitation, a computer, a desktop computer, a workstation, a laptop computer, a notebook computer, a tablet computer, a smartphone, a distributed computing system, a multiprocessor system, a consumer electronic device, a smart appliance, and/or any other computing device capable of optimizing exponential calculations. Similar to the library computing device 100 of FIG. 1, the application computing device 200 includes the processor 202, the I/O subsystem 204, the memory 206, a data storage 210, and one or more peripheral devices 212. As such, further descriptions of the like components are not repeated herein for clarity of the description with the understanding that the description of the corresponding components provided above in regard to the library computing device 100 of FIG. 1 applies equally to the corresponding components of the application computing device 200 of FIG. 2.

Figure 3:
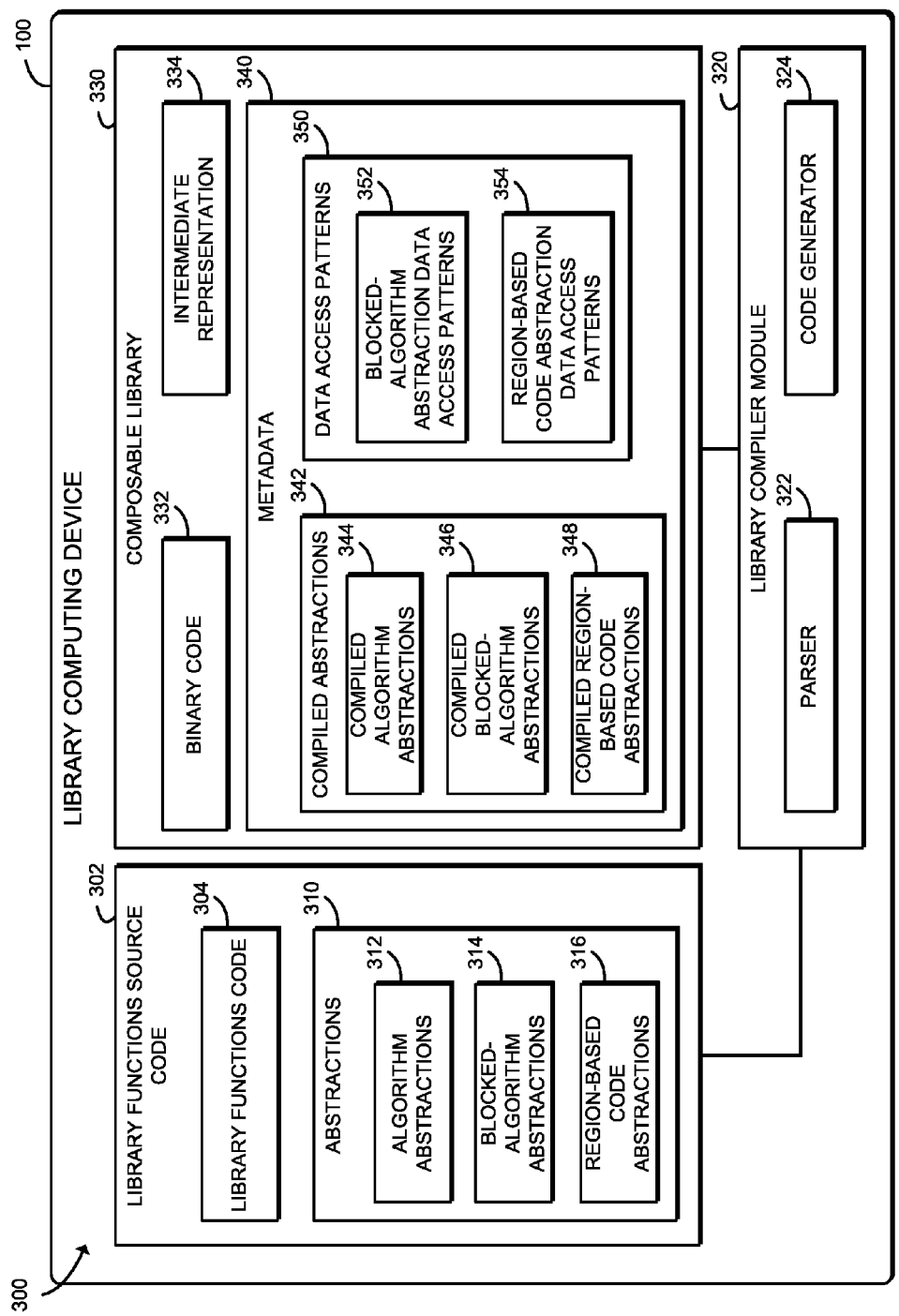
FIG. 3 is a simplified block diagram of at least one embodiment of an environment of the computing device of FIG. 1.

Referring now to FIG. 3, in one embodiment, the library computing device 100 establishes an environment 300 during operation. The illustrative embodiment 300 includes library functions source code 302, a library compiler module 320, and a composable library 330. The various modules and sub-modules of the environment 300 may be embodied as hardware, firmware, software, or a combination thereof. The library functions source code 302 includes library functions code 304 and abstractions 310. As will be described in further detail below, the library functions code 304 may be translated into binary code and/or an intermediate representation. The library functions code 304 may include typical source code features such as control flow statements, data structures, and the like. The abstractions 310 include, from a high level to a low level, algorithm abstractions 312, blocked-algorithm abstractions 314, and region-based code abstractions 316, each enabling, or guiding, library function composability at different levels. The algorithm abstractions 312 may include an algorithm for each library function of the library functions code 304. The blocked-algorithm abstractions 314 may be loop nests around calls to library functions that may describe how an iteration space may be tiled such that a library function works on tiles (i.e., partitions of a loop's iteration space) one by one. The region-based code abstractions 316 may be written as a tree of nodes, or regions, for each library function, wherein each region may include a data space, an iteration space, and/or tuning parameters.

As noted previously, the library compiler module 320 is configured to compile the library functions code 304 to generate the composable library 330 using the abstractions 310 as a guide, instead of being extended with semantics of the library functions in the library functions code 304. In other words, feasibility and/or benefit analyses may be performed based on the abstractions 310, without analyzing internal (i.e., semantic) details of the library functions. The illustrative library compiler module 320 includes a parser 322 and a code generator 324 sub-modules. The library compiler module 320 may process the library functions code 304 by parsing the library functions code 304 using the parser 322 to build an intermediate representation 334 of the library functions code 304 and generating binary code 332 (i.e., a binary) of the composable library 330 using the code generator 324. Of course, in some embodiments, the library compiler module 320 may perform additional optimizations on the intermediate representation 334.

Additionally, the library compiler module 320 is further configured to encode compiled abstractions 342, compiled from the abstractions 310, and store them into metadata 340 of the composable library 330. For example, the library compiler module 320 may be configured to encode the compiled algorithm abstractions 344, the compiled blocked-algorithm abstractions 346, and the compiled region-based code abstractions 348 into the metadata 340. Additionally, in some embodiments, the library compiler module 320 may be configured to infer data access patterns 350 of one or more loops of the compiled abstractions 342, such as "parallel-for" loops. In some embodiments, the data access patterns 350 may be stored in the metadata 340. For example, in the illustrative data access patterns 350, blocked-algorithm abstraction data access patterns 352 and the region-based code abstraction data access patterns 354 may be encoded into the metadata 340. In some embodiments, the compiled blocked-algorithm abstractions 346 and/or the compiled region-based code abstractions 348 may support generating "template" code, whose "holes" may be filled with runtime constants to dynamically adapt to hardware resource usage of a computing device, for example. Additionally, the library compiler module 320 may keep an intermediate representation for each region of the compiled region-based code abstractions 348, in order to allow fine-grain composition with other regions of other library functions.

Figure 4:
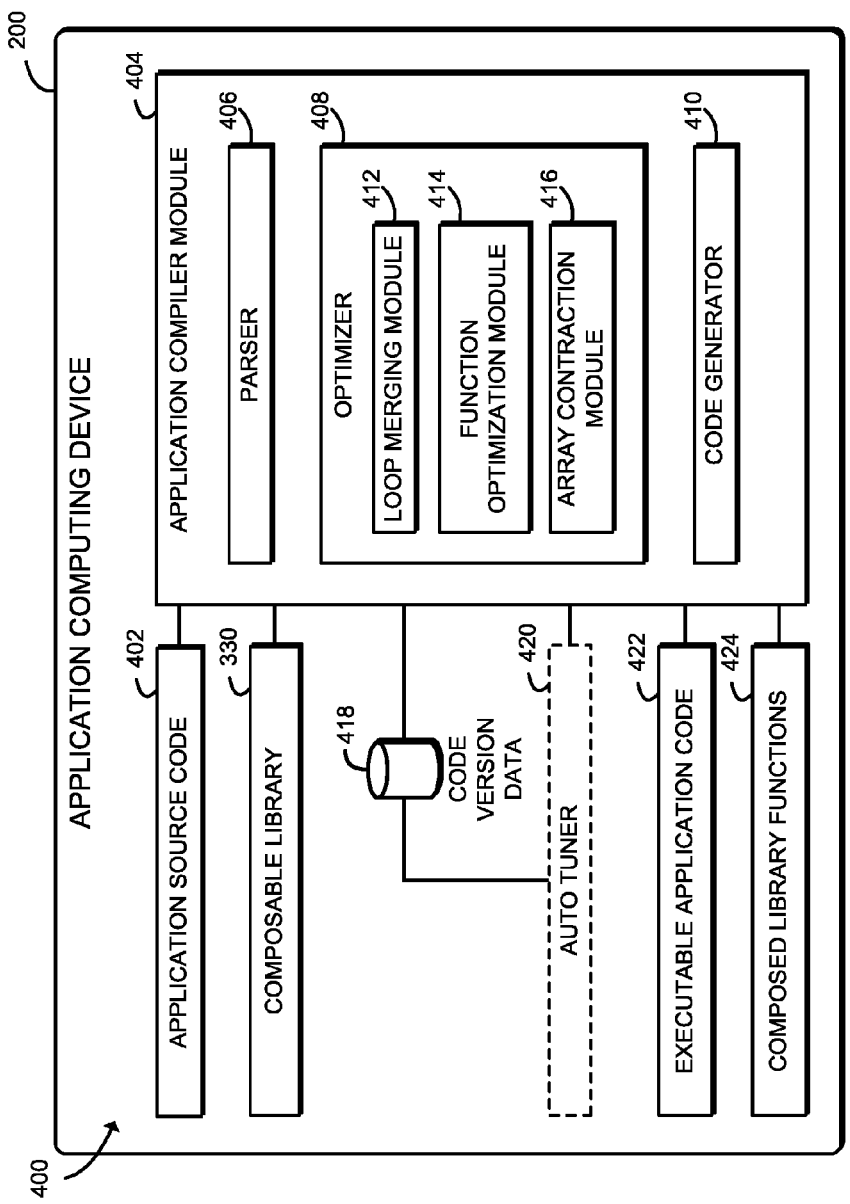
FIG. 4 is a simplified block diagram of at least one embodiment of an environment of the computing device of FIG. 2.

Referring now to FIG. 4, in one embodiment, the application computing device 200 establishes an environment 400 during operation. The illustrative embodiment 400 includes application source code 402, the composable library 330, an application compiler module 404, executable application code 422, and in some embodiments, an auto tuner 420. The various modules and sub-modules of the environment 400 may be embodied as hardware, firmware, software, or a combination thereof. The application source code 402 includes symbols that may be translated into machine-executable code. The application source code 402 may include typical application source code features, such as executable statements, control flow statements, data structures, and the like. The application source code 402 may be embodied as C or C++ code, FORTRAN code, Java code, C# code, Objective C code, or any other computer code accepted by the application compiler module 404.

The application compiler module 404 is configured to process the application source code 402, compose library functions, and produce the executable application code 422. In some embodiments, the application compiler module 404 may process the application source code 402 in stages. For example, the application compiler module 404 may parse the application source code 402 to build an intermediate representation of the application source code 402, optimize the intermediate representation, and generate the executable application code 422 based on the intermediate representation. Additionally, arrays are the first-class citizen in describing the abstractions, so the application compiler module 404 analyzes the library functions at array-level. Thus, certain functions, such as HPC functions, which commonly work on arrays, may be aligned.

In some embodiments, the functions performed by the application compiler module 404 may be performed by sub-modules of the application compiler module 404. In the illustrative application compiler module 404, the functions may be performed by a parser 406, an optimizer 408, and/or a code generator 410. For example, the optimizer 408 may be configured to optimize the intermediate representation by detecting code segments containing loops, such as "parallel-for" loops, within calls to the library functions based on the compiled abstractions 342 and the data access patterns 350 in the metadata 340 of the composable library 330. In some embodiments, the functions of the optimizer 408 may be performed by sub-modules, for example, by a loop merging module 412, a function optimization module 414, and/or an array contraction module 416. In some embodiments, the function optimization module 414 may be configured to perform standard global optimizations, such as, value propagation, dead code elimination, and/or function inlining. Additionally or alternatively, the array contraction module 416 may be configured to contract arrays, such as intermediate arrays, and/or replace the intermediate arrays with scalars.

Unlike traditional library composition methods that compose library calls by inlining at source level, such as open-source library functions, the application compiler module 404 may be configured to compose library functions at a level more abstract than languages, such as at math or graph level. The application compiler module 404 may be configured to merge loop nests across two different library functions using the loop merging module 412. For example, the application compiler module 404 may merge a "producer" loop nest from one library function with a "consumer" loop nest of another library function, such that, in each tile, data may be consumed as soon as the data is produced. In such an example, by moving computations from two library function calls into the same loop, one library function call may generate some results that are used in the later library function call. In other words, code motion may be employed across library function calls (i.e., the producer-consumer example described previously is moved to adjacency). As such, data reuse may be achieved at a cache level (i.e., at on-processor memory of the computing device running the executable application code 422). Additionally, temporary arrays used by both library functions may be contracted, such as into scalars, using the array contraction module 416. As such, data reuse may be achieved at a register level (i.e., at a register of a processor of the computing device running the executable application code 422). In some embodiments, composing the library functions may remove redundant computation. For example, generally, a library function normalizes its input array internally; however, if another library function can be composed with the library function that normalizes its input array internally, the next function may avoid normalization. As such, memory usage and/or compute time may be reduced.

Additionally or alternatively, the application compiler module 404 may generate more than one code version of the library functions, which the application compiler may store in the code version data 418. From the code version data 418, the auto tuner 420 may select a preferred version of each library function based on one or more optimization parameters, described in further detail below. In some embodiments, the optimization parameters may be chosen dynamically at runtime.

The executable application code 422 includes machine-executable code generated by the application compiler module 404 based on the application source code 402 and composed library functions 424, which will be described in further detail below. The executable application code 422 may be embodied as binary code directly executable on a computing device, binary object code that may be linked with other code to produce an executable, precompiled header files that may be incorporated into an executable, or any other output file typically produced by an application compiler module 404. The executable application code 422 may be targeted to a particular computer instruction set or otherwise targeted to the architecture of a particular computing device. In some embodiments, the executable application code 422 may be executable by the application computing device 200 itself. In other embodiments, the executable application code 422 may be executable by a target computing device other than the application computing device 200 (not shown). In such embodiments, the application compiler module 404 may be a so-called "cross compiler."

Figure 5:
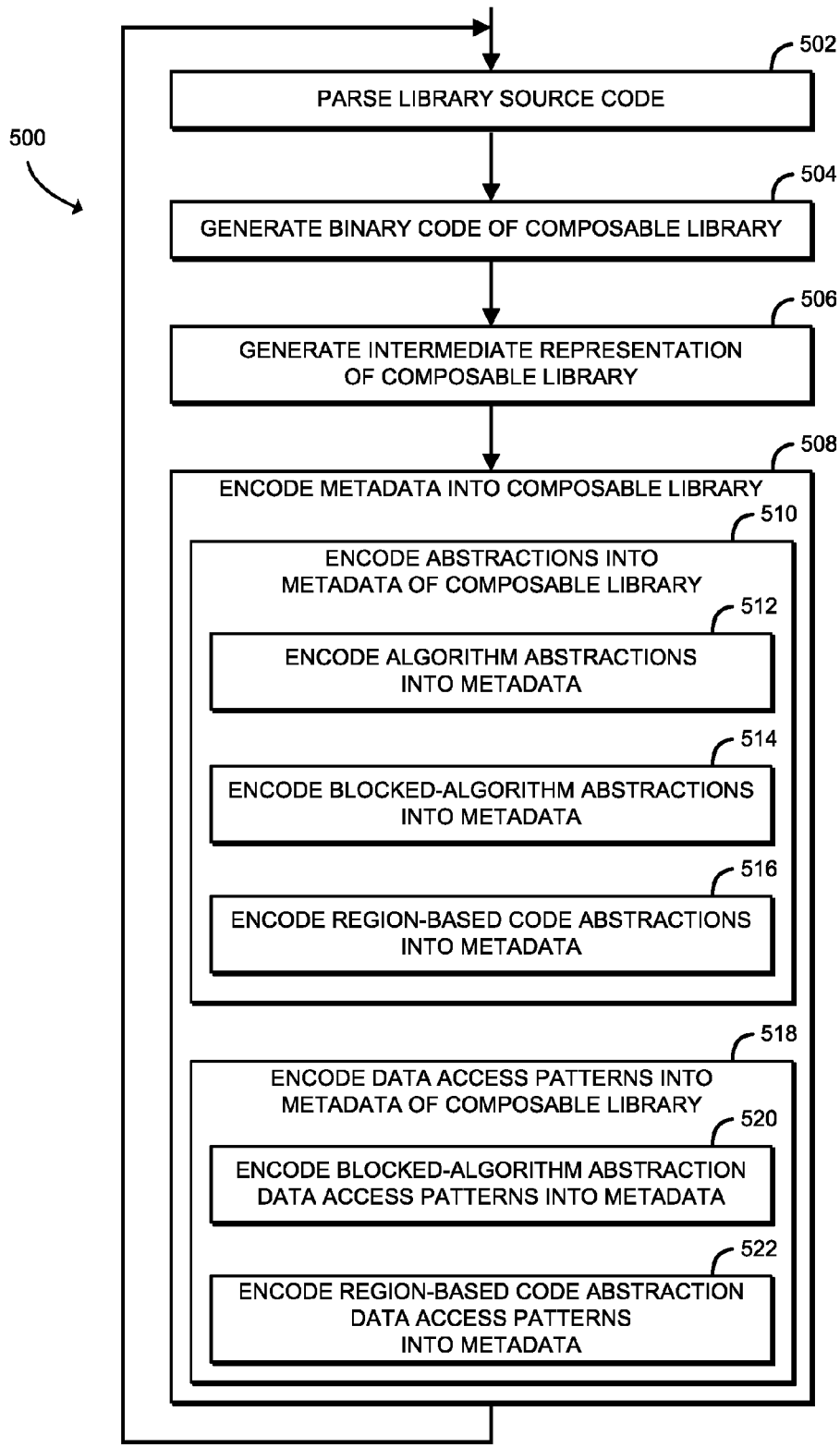
FIG. 5 is a simplified flow diagram of at least one embodiment of a method for generating a composable library that may be executed by the computing device of FIG. 1.

Referring now to FIG. 5, in use, the library computing device 100 may execute a method 500 for generating a composable library 330. The method 500 may be executed by the library compiler module 320 during compilation of the library functions source code 302 to generate the composable library 330. The method 500 begins in block 502, in which the library compiler module 320 parses the library functions source code 302. The parse stage of block 502 may generate an in-memory representation of the library functions source code 302 that may be analyzed and modified by later stages of the library compiler module 320. For example, the library compiler module 320 may generate an intermediate representation of the library functions source code 302. In block 504, the library compiler module 320 generates binary code 332 of the composable library 330. In block 506, the library compiler module 320 generates an intermediate representation 334 of the composable library 330.

In block 508, the library compiler module 320 encodes the metadata 340 into the composable library 330. In some embodiments, in block 510, the library compiler module 320 encodes the compiled abstractions 342 into the metadata 340 of the composable library 330. For example, in blocks 512, 514, and 516, the library compiler module 320 encodes the compiled algorithm abstractions 344, the compiled blocked-algorithm abstractions 346, and the compiled region-based code abstractions 348, respectively, into the metadata 340. In some embodiments, in block 518, the library compiler module 320 may encode the data access patterns 350 into the metadata 340 of the composable library 330. For example, in blocks 520 and 522, the library compiler module 320 encodes the blocked-algorithm abstraction data access patterns 352 and the region-based code abstraction data access patterns 354, respectively, into the metadata 340.

Referring now to FIG. 6, sample pseudocode 600 illustrates sample abstractions that may be used in a composable library. For example, the sample pseudocode 600 illustrates a matrix add library function. In the sample pseudocode 600, a sample of each of the algorithm abstractions 312, the blocked-algorithm abstractions 314, and the region-based code abstractions 316 are shown. In pseudocode 600, pseudocode block 602 illustrates an algorithm abstraction in a general format of:

pragma *AA* in(arrays:dimensions])out(arrays:dimensions],allocif(condition))  (1)

semantics description  (2)

The "in( )" and "out( )" clauses describe the input and output arrays. Due to each abstraction level being independent of the other abstraction levels, the "in( )" and "out( )" clauses may also appear in the corresponding blocked-algorithm abstraction and region-based code abstraction, which also specify the input and output arrays.

An output array may have an "allocif(condition)" option as shown in the pseudocode block 602 to notify the application compiler module 404 to generate an allocation for the output array if the condition is true. For example, a condition may be "NULL" to indicate to allocate memory for the output array if the allocation has not yet been performed, or "true" to indicate to always allocate memory for the output array. This allocation may be necessary when a library function outputs an array to another library function as input. Under such conditions, the array is considered intermediate, and may be contracted into a scalar. As such, an allocation may not be needed, and the "allocif(condition)" option allows the application compiler module 404 to generate a "malloc( )" call, if needed. Semantics of the library functions may be expressed in any form, such as a dataflow graph, by basic parallel matrix operations (e.g., map, reduce, gather, scatter, etc.), or by element-wise operations. As shown, the pseudocode block 602 indicates the input arrays are A and B, and C is the output array, which needs to be allocated if not already allocated. As shown, each of the arrays A, B, and C have dimensions [M, N]. Additionally, the pseudocode block 602 indicates that each element of output array C is the sum of the corresponding elements of input arrays A and B.

In the pseudocode 600, pseudocode block 604 illustrates a blocked-algorithm abstraction example in a general format of:

pragma BA in(arrays:[dimensions])out(arrays:[dimensions],allocif(condition))   (3)

parameters( . . . ) for each tile{function(tile)}   (4)

The iteration space of each library function may be divided (i.e., partitioned) into smaller blocks, or tiles, and a function may be called to loop around each tile. The "parameters( . . . )" indicate the symbolic tile size. In some embodiments, the "parameters( . . . )" may have recommended values, as shown in the pseudocode block 604. The remaining body of the pseudocode block 604 may be a sequence of C statements. As such, parallel techniques, such as Open Multi-Processing (OpenMP), Message Passing Interface (MPI), and the like, may be used.

In the pseudocode block 604, a double loop nest is shown around a call to the library function, which is annotated with OpenMP for parallelism. In some embodiments, the parameters may be symbolic at compile time and constant at runtime. In such embodimetns, "template" code may be generated including "holes" that may be filled in with runtime constants, which may be determined dynamically based on resource usage of hardware of a computing device, for example. As shown by the "#pragma omp task . . . " shown in the pseudocode block 604, each tile may be a task. Therefore, the scheduling of tiles may be dynamic. For example, the runtime system may determine dependencies between tiles using the "in( )" and "out( )" clauses. Thus, dependent tiles may be dynamically scheduled together in the same processor, core, and/or GPU to achieve data reuse and reduce communication time.

In the sample pseudocode 600, the pseudocode block 606 illustrates a region-based code abstraction in a general format of:

pragma CA clauses   (5)

The region-based code abstractions decompose a library function into a tree of regions, or nodes. As shown in the pseudocode block 606, a region-based code abstraction region is in the form of a C statement following the general format, which may include compound statements enclosed in the form of "{ . . . }". For example, if the C statement is a selection statement (e.g., "if/switch") or an iteration statement (e.g., "for/while/do"), the region may additionally include all the statements in the other branches of the selection statement and/or the loop body of the iteration statement.

In some embodiments, region-based code abstractions may be designed to be a superset of OpenMP. In such embodiments, OpenMP clauses may be used. In the pseudocode block 606, OpenMP clauses "parallel for" and "SIMD" are used. In some embodiments, new clauses may be introduced by the region-based code abstractions to support analysis in the application compiler module 404. In such embodiments, after the analysis has been performed, the new clauses may be discarded, and the application compiler module 404 may handle the remaining clauses as the application compiler module 404 may for OpenMP clauses. The new clauses may include the following clauses illustrated below in Table 1.

TABLE 1

New region-based code abstraction clauses.

| New Clauses | Description |
|---|---|
| in(arrays:[dimensions]) out(arrays:[dimensions]) | The input and output of the region |
| alloc(array) | The region allocates memory for an array |
| free(array) | The region releases the memory of an array |
| tile | the loop is specifying a tile |
| IV(variable: start:end:step:recommended_value_of_step) | The induction variable information defining the iteration space. The step may be symbolic and/or have a recommended value. |
| UDF(func in:data,restrict out:data, restrict) | The region calls a user-defined function, or UDF, with the input and output. |

The "in( )" and "out( )" clauses may describe the data space of the region, summarizing the input arrays into the region and the output arrays produced by the region. The output arrays may be considered for array contraction. The "alloc( )" and "free( )" clauses may further describe the usage of temporary memory (i.e., another aspect of the data space). The "tile" clause defines one dimension of a tile, and several continuous "tile" clauses may define a complete tile. The "IV( )" clause details an induction variable of a dimension of the tile. In an embodiment wherein a "UDF( )" clause is an argument of a library function, the "UDF( )" clause specifies a legal condition that the "UDF( )" clause may be called in and composed with the library function. The "UDF( )" clause may "restrict" the input and/or the output if the input or output is a pointer in order for the "UDF( )" clause to be legally called in and composed with the library function. In other words, that pointer may be restricted to being the only pointer that may be used to access the object to which the pointer points. As a result, potentially harmful memory issues associated with the restricted pointer may be avoided. For example, under certain conditions, such as wherein it might be incorrect to have parallel clauses (e.g., "parallel for" clauses), a "UDF( )" call may create a loop-carried dependence for the arrays and make it invalid to parallelize a loop. Under such conditions, the pointer should be restricted so that the loop-carried dependence is not created.

Referring now to FIG. 7, an example of a data access pattern 700 is illustrated. As noted previously, the library compiler module 320 compiles and generates binary code 332 into a composable library 330 that includes composable library functions. As also noted previously, the library compiler module 320 encodes the compiled abstractions 342 and data access patterns 350 into the metadata 340 of the composable library 330. The data access patterns 350 may be inferred data access patterns for "parallel-for" clause loops, which may be aided by the compiled blocked-algorithm abstractions 346 and/or the compiled region-based code abstractions 348 encoded in the metadata 340. For example, based on the "for each tile" expression of the blocked-algorithm abstraction illustrated in pseudocode block 604 of FIG. 6 (i.e., "for i=1 to M step M1", and "for j=1 to N step N1"), the library compiler module 320 may determine array A has the data access pattern 700. Additionally or alternatively, a data access pattern may be inferred for the region-based code abstraction illustrated in pseudocode block 606 of FIG. 6.

Figure 8:
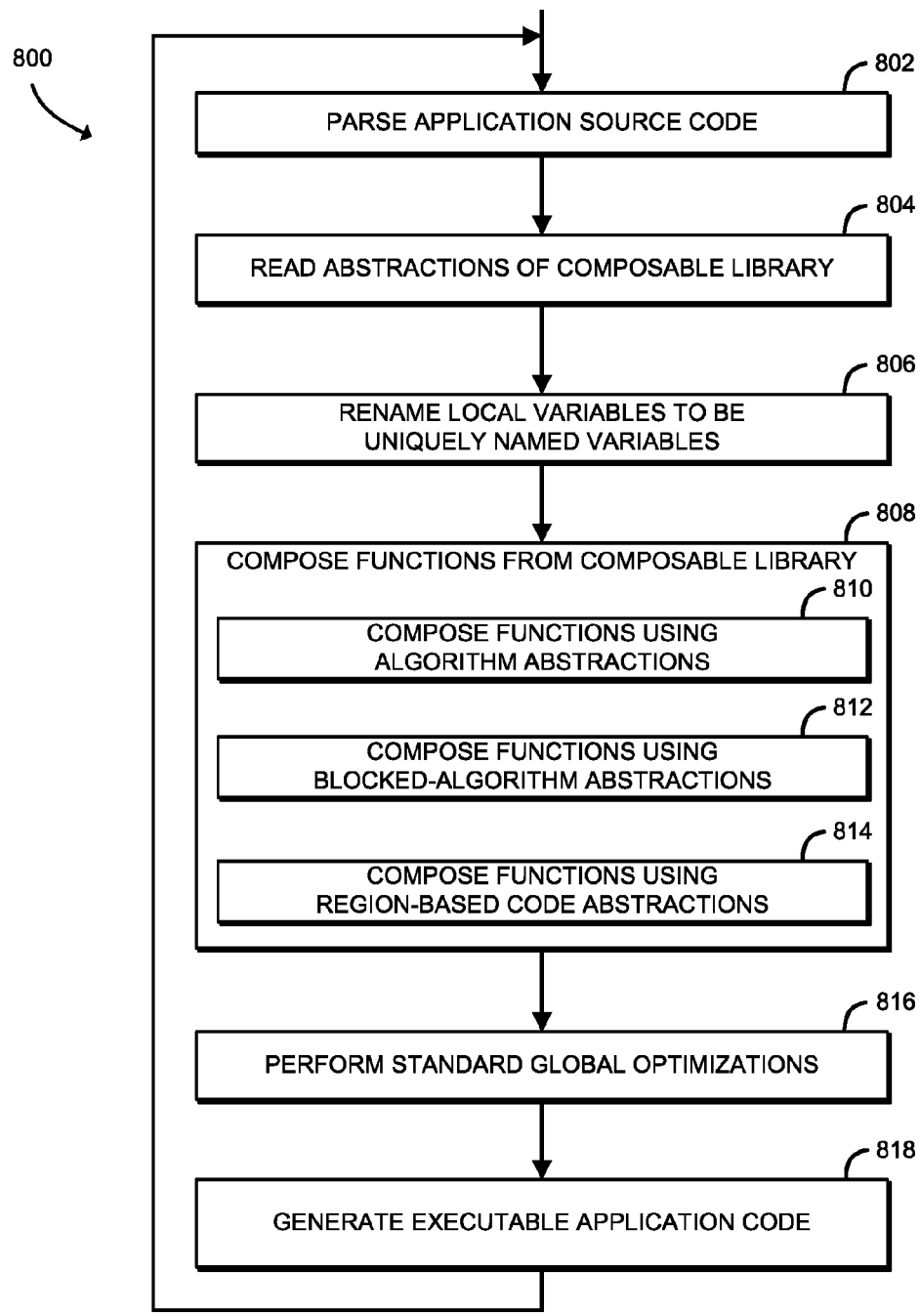
FIG. 8 is a simplified flow diagram of at least one embodiment of a method for generating an application that may be executed by the computing device of FIG. 2.

Referring now to FIG. 8, in use, the application computing device 200 may execute a method 800 for generating an executable application. The method 800 may be executed by the application compiler module 404 during compilation of the application source code 402 to generate the executable application code 422. The method 800 begins in block 802, in which the application compiler module 404 parses the application source code 402. The parse stage of block 802 may generate an in-memory representation of the application source code 402 that may be analyzed and modified by later stages of the application compiler module 404. For example, the application compiler module 404 may generate an intermediate representation of the application source code 402.

In block 804, the application compiler module 404 reads the compiled abstractions 342 encoded in the composable library 330. In block 806, the application compiler module 404 renames local variables of library functions to be unique. In block 808, the application compiler module 404 generates the composed library functions 424 from the composable library 330. To do so, based on the compiled abstractions 342, the application compiler module 404 may combine the bodies of two loops from two library functions, forming a single loop. In block 810, the application compiler module 404 composes library functions using the compiled algorithm abstractions 344, which is described in further detail below in FIG. 9. In block 812, the application compiler module 404 composes library functions using the compiled blocked-algorithm abstractions 346, which is described in further detail below in FIG. 10. In block 814, the application compiler module 404 composes library functions using the compiled region-based code abstractions 348, which is described in further detail below in FIG. 11. In block 816, the application compiler module 404 performs additional standard global optimizations, such as, value propagation, dead code elimination, array contracting, and/or inlining to remove intermediate arrays and/or replace the intermediate arrays with scalars. In block 818, the application compiler module 404 generates the executable application code 422 (i.e., the executable application).

Figure 9:
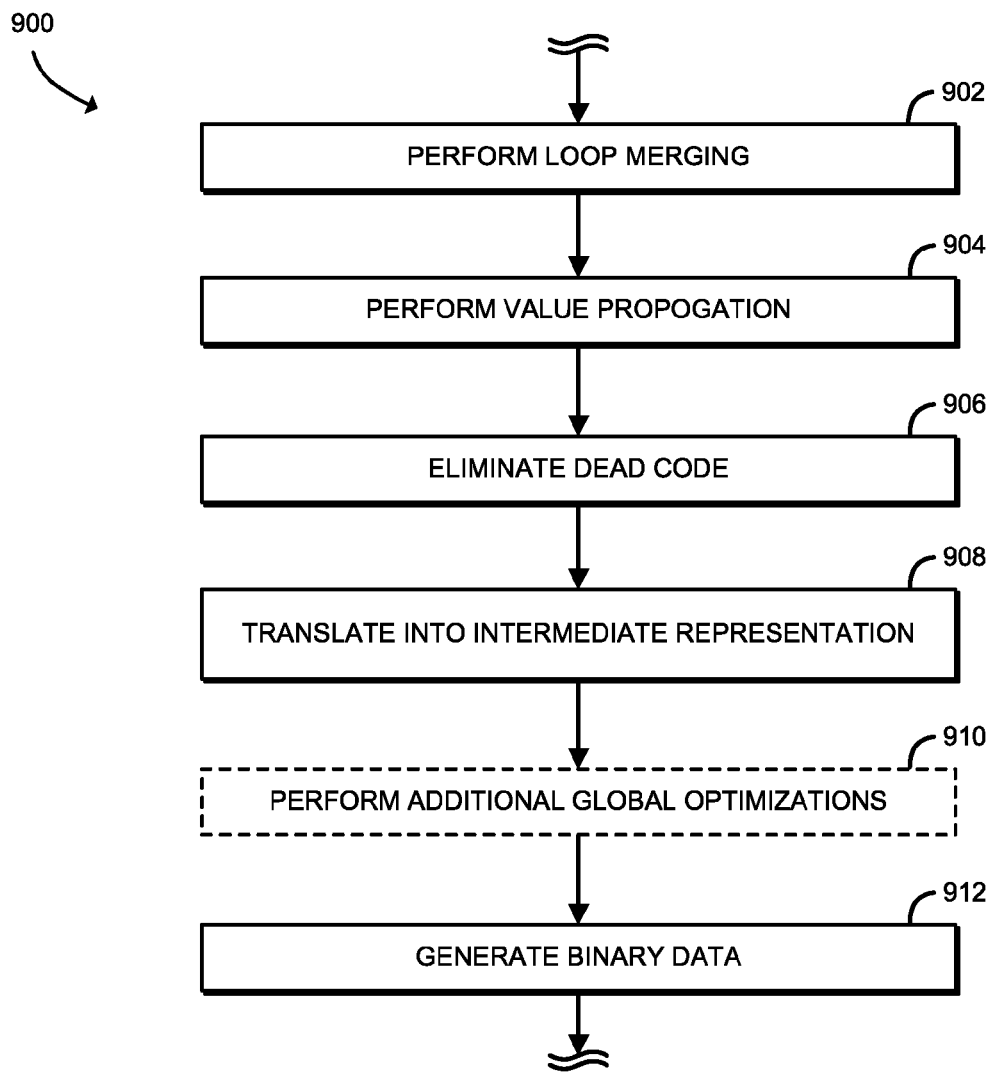
FIG. 9 is a simplified flow diagram of at least one embodiment of a method for composing library functions using algorithm abstractions that may be executed by the computing device of FIG. 2.

Referring now to FIG. 9, in use, the application computing device 200 may execute a method 900 for composing library functions using algorithm abstractions. The method 900 may be executed by the application compiler module 404 during composition of the library functions from the composable library 330 as shown in FIG. 8. The method 900 begins in block 902, in which the application compiler module 404 performs loop merging using the algorithm abstractions. In some embodiments, the loop merging may be performed with the algorithm abstractions at a mathematical level. Referring now to FIG. 12, a sample pseudocode 1200 is illustrated of two library function calls prior to composition. Referring now to FIG. 13, a sample psuedocode block 1300 of algorithm abstractions for the two library function calls of FIG. 12 is illustrated. Referring back to FIG. 9, in block 904, the application compiler module 404 performs a value propagation. In block 906, the application compiler module 404 eliminates dead code based on the value propagation. Referring now to FIG. 14, a sample pseudocode 1400 illustrates a result of a loop merge followed by the value propagation and dead code elimination performed on the two library function calls of FIG. 12, using the algorithm abstractions of FIG. 13. A shown in the pseudocode 1400, the application compiler completely removed array D after value propagation. Referring back to FIG. 9, in block 910, the application compiler module 404 translates the result of the loop merge followed by the value propagation and the dead code elimination (i.e., the pseudocode 1400) into an intermediate representation. For example, the application compiler module 404 may translate the "allocif(NULL)" memory allocation of the pseudocode 1400 of FIG. 14 into an intermediate representation after performing the loop merge, value propagation, and dead code elimination, as illustrated in a sample pseudocode 1500 of FIG. 15.

Referring back to FIG. 9, in some embodiments, in block 910, the application compiler module 404 may perform additional global optimizations. For example, the application compiler module 404 may perform array contracting and/or inlining to remove intermediate arrays and/or replace the intermediate arrays with scalars. In block 912, the application compiler module 404 generates binary.

Figure 10:
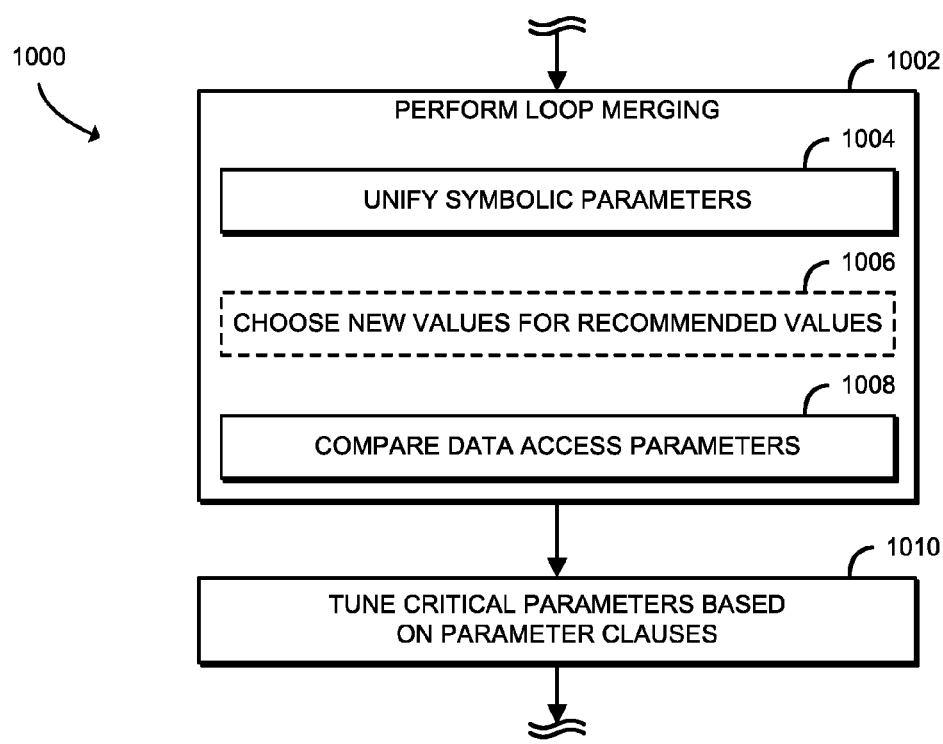
FIG. 10 is a simplified flow diagram of at least one embodiment of a method for composing library functions using blocked-algorithm abstractions that may be executed by the computing device of FIG. 2.

Referring now to FIG. 10, in use, the application computing device 200 may execute a method 1000 for composing library functions using blocked-algorithm abstractions. The method 1000 may be executed by the application compiler module 404 during composition of the library functions from the composable library 330 as shown in FIG. 8. The method 1000 begins in block 1002, in which the application compiler module 404 performs loop merging with the blocked-algorithm abstractions. The blocked-algorithm abstractions, in C loops, allow loop merging to be applied directly. For example, in FIG. 16, a pseudocode 1600 illustrates a result of a loop merge of the two library function calls illustrated in the sample pseudocode 1200 of FIG. 12 using the blocked-algorithm abstractions. During the loop merge process, the two symbolic parameters for each function, M1 and N1, are unified. In some embodiments, in block 1006, the application compiler module 404 may consider recommended values for each symbolic parameter and choose new values for the symbolic parameters, such that the array elements accessed in a tile do not cause a cache overflow. To correctly merge two parallel-for loops, the loop merge should not introduce new loop-carried dependencies. In block 1008, the application compiler module 404 may satisfy this requirement by comparing data access patterns of each loop to ensure that an array element written in a second parallel loop is not going to be accessed by a first parallel loop in a next iteration. In block 1010, the application compiler module 404 tunes critical parameters based on "parameters( . . . )" clauses that may be defined by blocked-algorithm abstractions.

Figure 11:
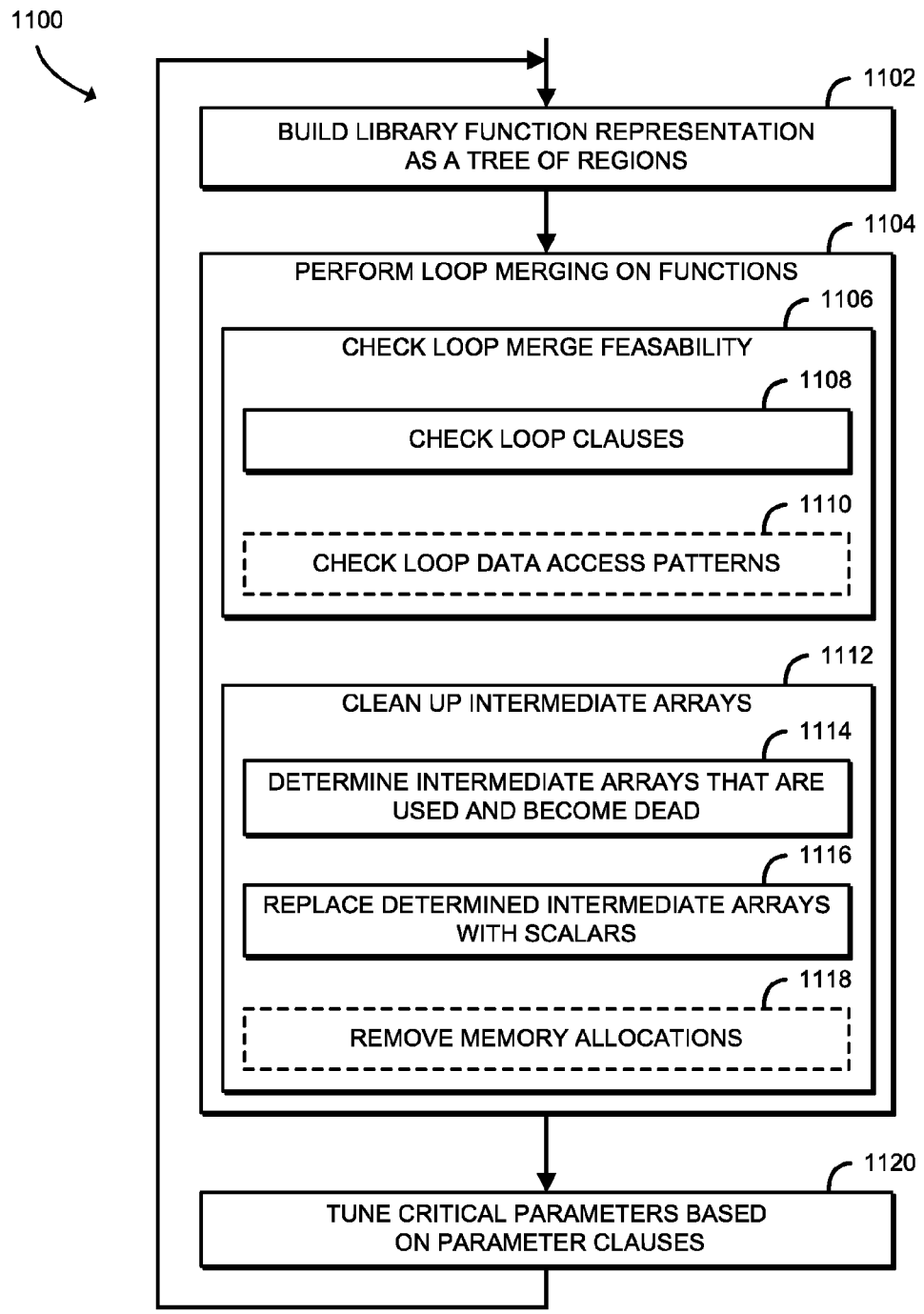
FIG. 11 is a simplified flow diagram of at least one embodiment of a method for composing library functions using region-based code abstractions that may be executed by the computing device of FIG. 2.

Referring now to FIG. 11, in use, the application computing device 200 may execute a method 1100 for composing library functions using region-based code abstractions. The method 1100 may be executed by the application compiler module 404 during composition of the library functions from the composable library 330 as shown in FIG. 8. The method 1100 begins in block 1102, in which the application compiler module 404 builds a representation for the library function as a tree, where each node is a region associated with a region-based code abstraction. As noted previously, an intermediate representation for each region of the compiled region-based code abstractions 348 may be included in the composable library 330, in order to allow fine-grain composition with other regions of other library functions. In other words, because the compiled region-based code abstractions 348 describe the regions of the library functions, if the application compiler module 404 performs an optimization across boundaries between regions, the application compiler module 404 may be configured to ensure the optimization does not contradict the compiled region-based code abstractions 348.

In block 1104, the application compiler module 404 merges loops from the library functions. In block 1106, the application compiler module 404 checks the feasibility of merging two loops. In block 1108, the application compiler module 404 checks the loop clauses. In some embodiments, in block 1110, the application compiler module 404 checks data access patterns of the loops. For example, the application compiler module 404 may check the "in( )" and "out( )" clauses, and the data access patterns. The "in( )" and "out( )" clauses describe the data spaces of the two loops (i.e., a first and second loop). In order to merge the two loops, one loop (i.e., the first loop) is required to move toward another loop (i.e., the second loop). In furtherance of the example, if a region A of the first loop crosses a region B of the second loop in moving, the output arrays of region A (B) may not overlap with the input or output arrays of region B (A). Additionally, as noted previously, merging two loops may not introduce new loop-carried dependencies, which may be ensured by checking the data access patterns of the two loops. In another example, the application compiler module 404 may check the "IV( )", "tile", and "parallel for" clauses. The two loops to be merged should have exactly the same iteration space, as indicated by the one or more "IV( )" clauses. The induction variables detailed by the "IV( )" clauses may be unified by renaming if they are different. Additionally, to ensure data locality and parallelism, if one loop to be merged is "tile" and/or "parallel for", the other loop to be merged should be also.

In block 1112, the application compiler module 404 cleans up any intermediate arrays. In block 1114, the application compiler module 404 determines which intermediate arrays are used that become dead. For example, results of a call to a library function may be consumed immediately by the next call to another library function, leaving the result array dead, which may result in unnecessary overhead. In block 1116, the application compiler module 404 may replace the intermediate arrays determined in block 1114 with scalars. In some embodiments, in block 1118, the application compiler module 404 may remove any memory allocations. For example, in FIG. 17, a pseudocode 1700 illustrates a result of a loop merge of the two library function calls illustrated in the pseudocode 1200 of FIG. 12 using the region-based code abstractions. As shown in the pseudocode 1700, the array D has been replaced with scalar d. Consequently, the corresponding allocation statement is removed.

Referring back to FIG. 11, in block 1120, the application compiler module 404 may tune critical parameters based on "parameters( . . . )" clauses that may be defined by region-based code abstractions. Additionally or alternatively, as noted previously, the application compiler module 404 may tune critical parameters based on "parameters( . . . )" clauses that may be defined by blocked-algorithm abstractions. For example, after merging two functions, the parameters may need to be re-tuned automatically. The "parameters( . . . )" clauses indicate to the application compiler module 404 which critical parameters to tune and the initial values of the critical parameters. As such, the application compiler module 404 may compose functions without compromising the tuning efforts of the code developer. For example, the application compiler module 404 may determine a total temporary memory size based on the "alloc( )" and "free( )" clauses, and determine the other memory size based on the "in( )" and "out( )" clauses. To avoid cache overflow, a total size of the total temporary size and the other memory size may be used to check that the total size does not exceed a cache capacity of a computing device on which the application compiler module 404 is running. The results of the check may be used to determine concrete values for the symbolic parameters in the "parameters( . . . )" clauses.

Of course, it should be appreciated that library functions may be composed without using each of the compiled algorithm abstractions 344, the compiled blocked-algorithm abstractions 346, and the compiled region-based code abstractions 348. To do so, the abstractions may be lowered to the same abstraction level. For example, the compiled algorithm abstractions 344 may be expanded into C loops. As such, each of the compiled algorithm abstractions 344, the compiled blocked-algorithm abstractions 346, and the compiled region-based code abstractions 348 are in C and may be merged.

Additionally, user defined functions may be composed using the compiled region-based code abstractions 348. For example, to measure a Euclidean distance between two similar vectors V and W, the Euclidean distance between each row of the first matrix V=(V1, V2, . . . , Vn) and each column of the second matrix W, (W1, W2, . . . , Wn) may be defined as:

Euclidean distance between two vectors, $V$ and $W$.  Equation 1

$$\text{distance} = \sqrt{\sum_{i=1}^{n}(V_i - W_i)^2}.$$

Though structurally similar to a matrix multiply, Equation 1 takes a square root of a sum of the square of the difference of the vectors is calculated, instead of multiplying every row element of a matrix with every column element of another matrix. Writing a Euclidean distance formula may not be ideal, since matrix multiplication has been tuned for multiple architectures over several decades. As such, instead of optimizing a Euclidian distance function, a matrix multiply function should be modified to accept a user-defined function (UDF).

Referring now to FIG. 18, a sample pseudocode 1800 illustrates a matrix multiply example that includes user-defined functions using region-based code abstractions. In pseudocode 1800, pseudocode block 1802 shows two prototypes for two customized function pointers, "MULADD" and "FINALIZE" In the sample pseudocode 1800, pseudocode block 1804 shows the function "mmul( )" that accepts the two customized function pointers as optional arguments. By default, as shown, the arguments of two customized function pointers are "NULL" by default, such that the "mmul( )" function may still be called in traditional ways, without requiring any changes. In pseudocode 1800, pseudocode block 1806 shows the outermost loop has been marked as "parallel-for". As such, the "mmul( )" function requires that the outermost loop is free from dependencies between its iterations. However, not every UDF called may respect such a requirement. Accordingly, a UDF may be required to have a "restrict" property for a pointer argument.

Figure 20:
FIG. 20 illustrates example pseudocode of a composed result of the user defined function of FIG. 19 using the composed matrix multiply function of FIG. 18 disclosed herein.

Referring now to FIG. 19, a sample pseudocode 1900 illustrates a user application that implements a Euclidian distance function with the "mmul( )" function of pseudocode block 1804 of FIG. 18. The application compiler module 404 may inline the matrix multiply function (i.e., the "mmul( )" function) into the user function "EuclidianDistance( )" as a result of an intermediate representation of the matrix multiply function being kept in the composable library 330 when the library compiler module 320 handles the region-based code abstractions 316. The application compiler module 404 may determine the two customized function pointers shown in pseudocode block 1802 of FIG. 18 are not "NULL". As such, the application compiler module 404 may inline them into the matrix multiply function. As a result, the entire user application may be optimized into a single function, as illustrated in a sample pseudocode 2000 of FIG. 20.

EXAMPLES

Illustrative examples of the technologies disclosed herein are provided below. An embodiment of the technologies may include any one or more, and any combination of, the examples described below.

Example 1 includes a computing device to generate a composable library, the computing device comprising a processor to establish a compiler module, wherein the compiler module is to generate the composable library that includes a binary representation and an intermediate representation of library functions based on source code of the library functions, and encode metadata into the composable library, wherein the metadata includes a plurality of abstractions of the library functions at different levels and data access patterns of at least a portion of the plurality of abstractions, and wherein the plurality of abstractions comprises algorithm abstractions at a first abstraction level, blocked-algorithm abstractions at a second abstraction level, and region-based code abstractions at a third abstraction level.

Example 2 includes the subject matter of Example 1, and wherein the algorithm abstractions at the first abstraction level comprises algorithm abstractions at an abstraction level higher than each of the blocked-algorithm abstractions and the region-based code abstractions, wherein the blocked-algorithm abstractions at the second abstraction level comprises blocked-algorithm abstractions at an abstraction level lower than the algorithm abstractions and at an abstraction level higher than the region-based code abstractions, and wherein the region-based code abstractions at the third abstraction level comprises region-based code abstractions at an abstraction level lower than each of the algorithm abstractions and the blocked-algorithm abstractions.

Example 3 includes the subject matter of any of Examples 1 and 2, and wherein the algorithm abstractions encode semantics of a library function.

Example 4 includes the subject matter of any of Examples 1-3, and wherein the algorithm abstractions at the first abstraction level comprises algorithm abstractions at an abstraction level more abstract than language level.

Example 5 includes the subject matter of any of Examples 1-4, and wherein the blocked-algorithm abstractions comprise loop nests around calls to the library functions.

Example 6 includes the subject matter of any of Examples 1-5, and wherein the blocked-algorithm abstractions define partitions of an iteration space of the library functions.

Example 7 includes the subject matter of any of Examples 1-6, and wherein the region-based code abstractions comprises library functions written as trees that include one or more regions.

Example 8 includes the subject matter of any of Examples 1-7, and wherein each region of the trees includes a data space and an iteration space of a library function.

Example 9 includes the subject matter of any of Examples 1-8, wherein each region of the trees further includes one or more tuning parameters of the library function.

Example 10 includes a computing device to generate an executable application, the computing device comprising a processor to establish a compiler module to generate the executable application, wherein to generate the executable application includes to compose library functions of a composable library, wherein the composable library includes a binary representation of the library functions, an intermediate representation of the library functions, and metadata, wherein the metadata includes a plurality of abstractions for each library function and data access patterns of at least a portion of the plurality of abstractions, and wherein the plurality of abstractions comprises a plurality of algorithm abstractions, a plurality of blocked-algorithm abstractions, and a plurality of region-based code abstractions, wherein the compiler module is to use the plurality of abstractions and the data access patterns as a guide to compose the library functions.

Example 11 includes the subject matter of Example 10, and wherein the compiler module includes a loop merging module to merge two loops of two library functions.

Example 12 includes the subject matter of any of Examples 10 and 11, wherein the compiler module performs a first library function composition process using the algorithm abstractions, wherein to perform the first library function composition process comprises to perform a first loop merge operation on a first algorithm abstraction of a first library function and a second algorithm abstraction of a second library function at a mathematical level.

Example 13 includes the subject matter of any of Examples 10-12, and wherein the compiler module performs a second library function composition process using the blocked-algorithm abstractions, wherein to perform the second library function composition process comprises to apply a second loop merge operation directly to a first loop of a first blocked-algorithm abstraction of the first library function and a second loop of a second blocked-algorithm abstraction of the second library function.

Example 14 includes the subject matter of any of Examples 10-13, and wherein to perform the second library function composition process further comprises to perform a comparison of the data access patterns of the first and second loops of the first and second blocked-algorithm abstractions to determine whether an array element of the second loop of the second blocked-algorithm abstraction is accessed by the first loop of the first blocked-algorithm abstraction in a next iteration.

Example 15 includes the subject matter of any of Examples 10-14, and wherein the compiler module performs a third library function composition process using the region-based code abstractions, wherein to perform the third library function composition process comprises to build a representation for each region-based code abstraction of the library functions and perform a third loop merge operation on a first loop of a first region-based code abstraction of the first library function and a second loop of a second region-based code abstraction of the second library function, and wherein the representation comprises a tree including one or more regions.

Example 16 includes the subject matter of any of Examples 10-15, and wherein to perform the third library function composition process using the first and second region-based code abstractions further comprises to check a feasibility of the third loop merge operation.

Example 17 includes the subject matter of any of Examples 10-16, and wherein to check the feasibility of the third loop merge operation comprises to determine whether an input array and an output array of the first and second loops of the first and second region-based code abstractions overlap, wherein to determine whether the input array and the output array overlap comprises to analyze the data access patterns of the first and second loops of the first and second region-based code abstractions.

Example 18 includes the subject matter of any of Examples 10-17, and wherein to check the feasibility of the third loop merge operation comprises to check an iteration space of the first and second loops of the first and second region-based code abstractions to determine whether the iteration space of the first loop of the first region-based code abstraction matches the second loop of the second region-based code abstraction.

Example 19 includes the subject matter of any of Examples 10-18, and wherein to perform the third library function composition process using the region-based code abstractions further comprises to determine whether an intermediate array will become dead after use and convert the intermediate array to a scalar in response to a determination that the intermediate array will become dead after use.

Example 20 includes the subject matter of any of Examples 10-19, and wherein the compiler module additionally includes a function optimization module to perform optimizations on a composed library function.

Example 21 includes the subject matter of any of Examples 10-20, and wherein the compiler module additionally includes an array contraction module to contract arrays into scalars.

Example 22 includes the subject matter of any of Examples 10-21, and wherein the compiler module is further to compose a user defined function based on the region-based code abstractions.

Example 23 includes a method for generating a composable library at a computing device, the method comprising compiling, by a compiler module of the computing device, source code of library functions; generating, by the compiler, the composable library as a result of the compiling the source code; and encoding, by the compiler, metadata into the composable library, wherein the composable library includes a binary representation and an intermediate representation of library functions, wherein the metadata includes a plurality of abstractions of the library functions at different levels and data access patterns of at least a portion of the plurality of abstractions, and wherein the plurality of abstractions comprises algorithm abstractions at a first abstraction level, blocked-algorithm abstractions at a second abstraction level, and region-based code abstractions at a third abstraction level.

Example 24 includes the subject matter of Example 23, and wherein the algorithm abstractions at the first abstraction level comprises algorithm abstractions at an abstraction level higher than each of the blocked-algorithm abstractions and the region-based code abstractions, wherein the blocked-algorithm abstractions at the second abstraction level comprises blocked-algorithm abstractions at an abstraction level lower than the algorithm abstractions and at an abstraction level higher than the region-based code abstractions, and wherein the region-based code abstractions at the third abstraction level comprises region-based code abstractions at an abstraction level lower than each of the algorithm abstractions and the blocked-algorithm abstractions.

Example 25 includes the subject matter of any of Examples 23 and 24, and wherein the algorithm abstractions encode semantics of a library function.

Example 26 includes the subject matter of any of Examples 23-25, and wherein the algorithm abstractions at the first abstraction level comprises algorithm abstractions at an abstraction level more abstract than language level.

Example 27 includes the subject matter of any of Examples 23-26, and wherein the blocked-algorithm abstractions comprise loop nests around calls to the library functions.

Example 28 includes the subject matter of any of Examples 23-27, and wherein the blocked-algorithm abstractions define partitions of an iteration space of the library functions.

Example 29 includes the subject matter of any of Examples 23-28, and wherein the region-based code abstractions comprises library functions written as trees that include one or more regions.

Example 30 includes the subject matter of any of Examples 23-29, and wherein each region of the trees includes a data space and an iteration space of a library function.

Example 31 includes the subject matter of any of Examples 23-30, and wherein each region of the trees further includes one or more tuning parameters of the library function.

Example 32 includes a method for generating an executable application at a computing device, the method comprising compiling, by a compiler module of the computing device, source code of an application; and generating, by the compiler, the executable application as a result of compiling the source code, wherein generating the executable application includes composing library functions of a composable library, wherein the composable library includes a binary representation of the library functions, an intermediate representation of the library functions, and metadata, wherein the metadata includes a plurality of abstractions for each library function and data access patterns of at least a portion of the plurality of abstractions, and wherein the plurality of abstractions comprises a plurality of algorithm abstractions, a plurality of blocked-algorithm abstractions, and a plurality of region-based code abstractions, wherein the compiler module is to use the plurality of abstractions and the data access patterns as a guide to compose the library functions.

Example 33 includes the subject matter of Example 32, and further including merging, by a loop merging module of the compiler module, two loops of two library functions.

Example 34 includes the subject matter of any of Examples 32 and 33, and further including performing, by a loop merging module of the compiler module, a first library function composition process using the algorithm abstractions, wherein performing the first library function composition process comprises performing a first loop merge operation on a first algorithm abstraction of a first library function and a second algorithm abstraction of a second library function at a mathematical level.

Example 35 includes the subject matter of any of Examples 32-34, and further including performing, by the loop merging module, a second library function composition process using the blocked-algorithm abstractions, wherein performing the second library function composition process comprises applying a second loop merge operation directly to a first loop of a first blocked-algorithm abstraction of the first library function and a second loop of a second blocked-algorithm abstraction of the second library function.

Example 36 includes the subject matter of any of Examples 32-35, and wherein performing the second library function composition process further comprises performing a comparison of the data access patterns of the first and second loops of the first and second blocked-algorithm abstractions to determine whether an array element of the second loop of the second blocked-algorithm abstraction is accessed by the first loop of the first blocked-algorithm abstraction in a next iteration.

Example 37 includes the subject matter of any of Examples 32-36, and further including performing, by the loop merging module, a third library function composition process using the region-based code abstractions, wherein performing the third library function composition process comprises building a representation for each region-based code abstraction of the library functions and performing a third loop merge operation on a first loop of a first region-based code abstraction of the first library function and a second loop of a second region-based code abstraction of the second library function, and wherein the representation comprises a tree including one or more regions.

Example 38 includes the subject matter of any of Examples 32-37, and wherein performing the third library function composition process using the first and second region-based code abstractions further comprises checking a feasibility of the third loop merge operation prior to performing the third library function composition process.

Example 39 includes the subject matter of any of Examples 32-38, and wherein checking the feasibility of the third loop merge operation comprises determining whether an input array and an output array of the first and second loops of the first and second region-based code abstractions overlap, and wherein determining whether the input array and the output array overlap comprises analyzing the data access patterns of the first and second loops of the first and second region-based code abstractions.

Example 40 includes the subject matter of any of Examples 32-39, and wherein checking the feasibility of the third loop merge operation comprises checking an iteration space of the first and second loops of the first and second region-based code abstractions to determine whether the iteration space of the first loop of the first region-based code abstraction matches the second loop of the second region-based code abstraction.

Example 41 includes the subject matter of any of Examples 32-40, and wherein performing the third library function composition process using the region-based code abstractions further comprises determining whether an intermediate array will become dead after use and converting the intermediate array to a scalar in response to a determination that the intermediate array will become dead after use.

Example 42 includes the subject matter of any of Examples 32-41, and further including performing, by the compiler module, optimizations on a composed library function.

Example 43 includes the subject matter of any of Examples 32-42, and further including contracting, by the compiler module, arrays into scalars.

Example 44 includes the subject matter of any of Examples 32-43, and further including composing, by the compiler module, a user defined function based on the region-based code abstractions.

Example 45 includes a computing device comprising a processor and a memory having stored therein a plurality of instructions that when executed by the processor cause the computing device to perform the method of any of Examples 23-44.

Example 46 includes one or more machine readable storage media comprising a plurality of instructions stored thereon that in response to being executed result in a computing device performing the method of any of Examples 23-44.

Example 47 includes a computing device for generating a composable library at a computing device, the computing device comprising means for compiling, by a compiler module of the computing device, source code of library functions; means for generating, by the compiler, the composable library as a result of the compiling the source code; and means for encoding, by the compiler, metadata into the composable library, wherein the composable library includes a binary representation and an intermediate representation of library functions, wherein the metadata includes a plurality of abstractions of the library functions at different levels and data access patterns of at least a portion of the plurality of abstractions, and wherein the plurality of abstractions comprises algorithm abstractions at a first abstraction level, blocked-algorithm abstractions at a second abstraction level, and region-based code abstractions at a third abstraction level.

Example 48 includes the subject matter of Example 47, and wherein the algorithm abstractions at the first abstraction level comprises algorithm abstractions at an abstraction level higher than each of the blocked-algorithm abstractions and the region-based code abstractions, wherein the blocked-algorithm abstractions at the second abstraction level comprises blocked-algorithm abstractions at an abstraction level lower than the algorithm abstractions and at an abstraction level higher than the region-based code abstractions, and wherein the region-based code abstractions at the third abstraction level comprises region-based code abstractions at an abstraction level lower than each of the algorithm abstractions and the blocked-algorithm abstractions.

Example 49 includes the subject matter of any of Examples 47 and 48, and wherein the algorithm abstractions encode semantics of a library function.

Example 50 includes the subject matter of any of Examples 47-59, and wherein the algorithm abstractions at the first abstraction level comprises algorithm abstractions at an abstraction level more abstract than language level.

Example 51 includes the subject matter of any of Examples 47-50, and wherein the blocked-algorithm abstractions comprise loop nests around calls to the library functions.

Example 52 includes the subject matter of any of Examples 47-51, and wherein the blocked-algorithm abstractions define partitions of an iteration space of the library functions.

Example 53 includes the subject matter of any of Examples 47-52, and wherein the region-based code abstractions comprises library functions written as trees that include one or more regions.

Example 54 includes the subject matter of any of Examples 47-53, and wherein each region of the trees includes a data space and an iteration space of a library function.

Example 55 includes the subject matter of any of Examples 47-54, and wherein each region of the trees further includes one or more tuning parameters of the library function.

Example 56 includes a computing device for generating an executable application at a computing device, the computing device comprising means for compiling, by a compiler module of the computing device, source code of an application; and means for generating, by the compiler, the executable application as a result of compiling the source code, wherein the means for generating the executable application includes means for composing library functions of a composable library, wherein the composable library includes a binary representation of the library functions, an intermediate representation of the library functions, and metadata, wherein the metadata includes a plurality of abstractions for each library function and data access patterns of at least a portion of the plurality of abstractions, and wherein the plurality of abstractions comprises a plurality of algorithm abstractions, a plurality of blocked-algorithm abstractions, and a plurality of region-based code abstractions, wherein the compiler module is to use the plurality of abstractions and the data access patterns as a guide to compose the library functions.

Example 57 includes the subject matter of Example 56, and further including means for merging, by a loop merging module of the compiler module, two loops of two library functions.

Example 58 includes the subject matter of any of Examples 56 and 57, and further including further including means for performing, by a loop merging module of the compiler module, a first library function composition process using the algorithm abstractions, wherein the means for performing the first library function composition process comprises means for performing a first loop merge operation on a first algorithm abstraction of a first library function and a second algorithm abstraction of a second library function at a mathematical level.

Example 59 includes the subject matter of any of Examples 56-58, and further including means for performing, by the loop merging module, a second library function composition process using the blocked-algorithm abstractions, wherein the means for performing the second library function composition process comprises means for applying a second loop merge operation directly to a first loop of a first blocked-algorithm abstraction of the first library function and a second loop of a second blocked-algorithm abstraction of the second library function.

Example 60 includes the subject matter of any of Examples 56-59, and wherein the means for performing the second library function composition process further comprises means for performing a comparison of the data access patterns of the first and second loops of the first and second blocked-algorithm abstractions to determine whether an array element of the second loop of the second blocked-algorithm abstraction is accessed by the first loop of the first blocked-algorithm abstraction in a next iteration.

Example 61 includes the subject matter of any of Examples 56-60, and further including means for performing, by the loop merging module, a third library function composition process using the region-based code abstractions, wherein the means for performing the third library function composition process comprises means for building a representation for each region-based code abstraction of the library functions and means for performing a third loop merge operation on a first loop of a first region-based code abstraction of the first library function and a second loop of a second region-based code abstraction of the second library function, and wherein the representation comprises a tree including one or more regions.

Example 62 includes the subject matter of any of Examples 56-61, and wherein the means for performing the third library function composition process using the first and second region-based code abstractions further comprises means for checking a feasibility of the third loop merge operation prior to performing the third library function composition process.

Example 63 includes the subject matter of any of Examples 56-62, and wherein the means for checking the feasibility of the third loop merge operation comprises means for determining whether an input array and an output array of the first and second loops of the first and second region-based code abstractions overlap, and wherein the means for determining whether the input array and the output array overlap comprises means for analyzing the data access patterns of the first and second loops of the first and second region-based code abstractions.

Example 64 includes the subject matter of any of Examples 56-63, and wherein the means for checking the feasibility of the third loop merge operation comprises means for checking an iteration space of the first and second loops of the first and second region-based code abstractions to determine whether the iteration space of the first loop of the first region-based code abstraction matches the second loop of the second region-based code abstraction.

Example 65 includes the subject matter of any of Examples 56-64, and wherein the means for performing the third library function composition process using the region-based code abstractions further comprises means for determining whether an intermediate array will become dead after use and means for converting the intermediate array to a scalar in response to a determination that the intermediate array will become dead after use.

Example 66 includes the subject matter of any of Examples 56-65, and further including means for performing, by the compiler module, optimizations on a composed library function.

Example 67 includes the subject matter of any of Examples 56-66, and further including means for contracting, by the compiler module, arrays into scalars.

Example 68 includes the subject matter of any of Examples 56-67, and further including means for composing, by the compiler module, a user defined function based on the region-based code abstractions.

The invention claimed is:
1. A computing device to generate a composable library, the computing device comprising:
a processor to establish a compiler module, wherein the compiler module is to generate the composable library that includes a binary representation and an intermediate representation of library functions based on source code of the library functions, and encode metadata into the composable library,
wherein the metadata includes a plurality of abstractions of the library functions at different levels of abstraction and data access patterns of at least a portion of the plurality of abstractions, and wherein the plurality of abstractions comprises algorithm abstractions at a first abstraction level, blocked-algorithm abstractions at a second abstraction level, and region-based code abstractions at a third abstraction level.

2. The computing device of claim 1, wherein the algorithm abstractions at the first abstraction level comprises algorithm abstractions at an abstraction level higher than each of the blocked-algorithm abstractions and the region-based code abstractions, wherein the blocked-algorithm abstractions at the second abstraction level comprises blocked-algorithm abstractions at an abstraction level lower than the algorithm abstractions and at an abstraction level higher than the region-based code abstractions, and wherein the region-based code abstractions at the third abstraction level comprises region-based code abstractions at an abstraction level lower than each of the algorithm abstractions and the blocked-algorithm abstractions.

3. The computing device of claim 1, wherein the algorithm abstractions encode semantics of a library function at an abstraction level more abstract than language level.

4. The computing device of claim 1, wherein the blocked-algorithm abstractions comprise loop nests around calls to the library functions.

5. The computing device of claim 1, wherein the blocked-algorithm abstractions define partitions of an iteration space of the library functions.

6. The computing device of claim 1, wherein the region-based code abstractions comprise library functions written as trees that include one or more regions, wherein each region of the trees includes a data space and an iteration space of a library function.

7. The computing device of claim 6, wherein each region of the trees further includes one or more tuning parameters of the library function.

8. A computing device to generate an executable application, the computing device comprising:

a processor to establish a compiler module to generate the executable application, wherein to generate the executable application includes to compose library functions of a composable library, wherein the composable library includes a binary representation of the library functions, an intermediate representation of the library functions, and metadata, wherein the metadata includes a plurality of abstractions for each library function and data access patterns of at least a portion of the plurality of abstractions, and wherein the plurality of abstractions comprises a plurality of algorithm abstractions, a plurality of blocked-algorithm abstractions, and a plurality of region-based code abstractions, wherein the compiler module is to use the plurality of abstractions and the data access patterns as a guide to compose the library functions.

9. The computing device of claim 8, wherein the compiler module performs a first library function composition process using the algorithm abstractions, wherein to perform the first library function composition process comprises to perform a first loop merge operation on a first algorithm abstraction of a first library function and a second algorithm abstraction of a second library function at a mathematical level.

10. The computing device of claim 9, wherein the compiler module performs a second library function composition process using the blocked-algorithm abstractions, wherein to perform the second library function composition process comprises to apply a second loop merge operation directly to a first loop of a first blocked-algorithm abstraction of the first library function and a second loop of a second blocked-algorithm abstraction of the second library function.

11. The computing device of claim 10, wherein to perform the second library function composition process further comprises to perform a comparison of the data access patterns of the first and second loops of the first and second blocked-algorithm abstractions to determine whether an array element of the second loop of the second blocked-algorithm abstraction is accessed by the first loop of the first blocked-algorithm abstraction in a next iteration.

12. The computing device of claim 10, wherein the compiler module performs a third library function composition process using the region-based code abstractions, wherein to perform the third library function composition process comprises to build a representation for each region-based code abstraction of the library functions and perform a third loop merge operation on a first loop of a first region-based code abstraction of the first library function and a second loop of a second region-based code abstraction of the second library function, and wherein the representation comprises a tree including one or more regions.

13. The computing device of claim 12, wherein to perform the third library function composition process using the region-based code abstractions further comprises to determine whether an intermediate array will become dead after use and convert the intermediate array to a scalar in response to a determination that the intermediate array will become dead after use.

14. One or more non-transitory, computer-readable storage devices comprising a plurality of instructions stored thereon that in response to being executed cause a computing device to:

compile, by a compiler module of the computing device, source code of library functions;

generate, by the compiler module, the composable library as a result of the compilation of the source code; and encode, by the compiler module, metadata into the composable library, wherein the composable library includes a binary representation and an intermediate representation of library functions, wherein the metadata includes a plurality of abstractions of the library functions at different levels of abstraction and data access patterns of at least a portion of the plurality of abstractions, and wherein the plurality of abstractions comprises algorithm abstractions at a first abstraction level, blocked-algorithm abstractions at a second abstraction level, and region-based code abstractions at a third abstraction level.

15. The one or more non-transitory, computer-readable storage devices of claim 14, wherein the algorithm abstractions at the first abstraction level comprises algorithm abstractions at an abstraction level higher than each of the blocked-algorithm abstractions and the region-based code abstractions, wherein the blocked-algorithm abstractions at the second abstraction level comprises blocked-algorithm abstractions at an abstraction level lower than the algorithm abstractions and at an abstraction level higher than the region-based code abstractions, and wherein the region-based code abstractions at the third abstraction level comprises region-based code abstractions at an abstraction level lower than each of the algorithm abstractions and the blocked-algorithm abstractions.

16. The one or more non-transitory, computer-readable storage devices of claim 14, wherein the algorithm abstractions encode semantics of a library function, wherein the blocked-algorithm abstractions comprise loop nests around calls to the library functions, wherein the blocked-algorithm abstractions define partitions of an iteration space of the library functions and comprise library functions written as trees that include one or more regions, and wherein each region of the trees includes a data space and an iteration space of the library function.

17. One or more non-transitory, computer-readable storage devices comprising a plurality of instructions stored thereon that in response to being executed cause a computing device to:
 compile, by a compiler module of the computing device, source code of an application; and
 generate, by the compiler module, the executable application as a result of compiling the source code,
 wherein to generate the executable application includes to compose one or more library functions of a composable library,
 wherein the composable library includes a binary representation of the library functions, an intermediate representation of the library functions, and metadata,
 wherein the metadata includes a plurality of abstractions for each library function and data access patterns of at least a portion of the plurality of abstractions, and wherein the plurality of abstractions comprises a plurality of algorithm abstractions, a plurality of blocked-algorithm abstractions, and a plurality of region-based code abstractions,
 wherein the compiler module is to use the plurality of abstractions and the data access patterns as a guide to compose the library functions.

18. The one or more non-transitory, computer-readable storage devices of claim 17, further comprising a plurality of instructions that in response to being executed cause the computing device to:
 perform, by the compiler module, a first library function composition process using the algorithm abstractions,
 wherein to perform the first library function composition process comprises to perform a first loop merge operation on a first algorithm abstraction of a first library function and a second algorithm abstraction of a second library function at a mathematical level.

19. The one or more non-transitory, computer-readable storage devices of claim 18, further comprising a plurality of instructions that in response to being executed cause the computing device to:
 perform, by the compiler module, a second library function composition process using the blocked-algorithm abstractions,
 wherein to perform the second library function composition process comprises to apply a second loop merge operation directly to a first loop of a first blocked-algorithm abstraction of the first library function and a second loop of a second blocked-algorithm abstraction of the second library function.

20. The one or more non-transitory, computer-readable storage devices of claim 19, wherein to perform the second library function composition process further comprises to perform a comparison of the data access patterns of the first and second loops of the first and second blocked-algorithm abstractions to determine whether an array element of the second loop of the second blocked-algorithm abstraction is accessed by the first loop of the first blocked-algorithm abstraction in a next iteration.

21. The one or more non-transitory, computer-readable storage devices of claim 19, further comprising a plurality of instructions that in response to being executed cause the computing device to:
 perform, by the compiler module, a third library function composition process using the region-based code abstractions,
 wherein to perform the third library function composition process comprises to build a representation for each region-based code abstraction of the library functions and to perform a third loop merge operation on a first loop of a first region-based code abstraction of the first library function and a second loop of a second region-based code abstraction of the second library function, and wherein the representation comprises a tree that includes one or more regions.

22. The one or more non-transitory, computer-readable storage devices of claim 21, wherein to perform the third library function composition process using the first and second region-based code abstractions further comprises to check a feasibility of the third loop merge operation prior to the third library function composition process being performed.

23. The one or more non-transitory, computer-readable storage devices of claim 22, wherein to check the feasibility of the third loop merge operation comprises to analyze the data access patterns of the first and second loops of the first and second region-based code abstractions to determine whether an input array and an output array of the first and second loops of the first and second region-based code abstractions overlap.

24. The one or more non-transitory, computer-readable storage devices of claim 22, wherein to check the feasibility of the third loop merge operation comprises to check an iteration space of the first and second loops of the first and second region-based code abstractions to determine whether the iteration space of the first loop of the first region-based code abstraction matches the second loop of the second region-based code abstraction.

25. The one or more non-transitory, computer-readable storage devices of claim 22, wherein to perform the third library function composition process using the region-based code abstractions further comprises to determine whether an intermediate array will become dead after use and to convert the intermediate array to a scalar in response to a determination that the intermediate array will become dead after use.

* * * * *